United States Patent [19]

Kobayashi

[11] Patent Number: 5,428,097
[45] Date of Patent: Jun. 27, 1995

[54] SILICONE RUBBER COMPOSITION

[75] Inventor: Hideki Kobayashi, Chiba, Japan

[73] Assignee: Dow Corning Toray Silicon Co., Ltd., Tokyo, Japan

[21] Appl. No.: 220,139

[22] Filed: Mar. 30, 1994

[30] Foreign Application Priority Data

Mar. 31, 1993 [JP] Japan .................... 5-096594

[51] Int. Cl.$^6$ .......................... C08K 3/36; C08L 83/06
[52] U.S. Cl. ..................... 524/493; 524/506; 525/104
[58] Field of Search ........... 525/104; 556/454; 528/42; 524/493, 506

[56] References Cited

U.S. PATENT DOCUMENTS

| | | | |
|---|---|---|---|
| 3,630,982 | 12/1971 | Matherly | 525/104 |
| 3,969,309 | 7/1976 | Wright | 525/104 |
| 4,386,170 | 5/1983 | Monroe | 525/104 |
| 4,945,125 | 7/1990 | Dillon et al. | 525/104 |
| 4,980,443 | 12/1990 | Kendziorski et al. | 556/454 |
| 5,300,670 | 4/1994 | Kobayashi | 556/454 |

FOREIGN PATENT DOCUMENTS

| | | | |
|---|---|---|---|
| 56-5852 | 1/1981 | Japan | 525/104 |
| 58-194949 | 11/1983 | Japan . | |
| 60-36171 | 2/1985 | Japan . | |
| 63-297429 | 12/1988 | Japan | 556/454 |
| 64-125 | 1/1989 | Japan | 556/454 |
| 3-95226 | 4/1991 | Japan | 556/454 |
| 0754164 | 8/1956 | United Kingdom | 525/104 |

*Primary Examiner*—Robert E. Sellers
*Attorney, Agent, or Firm*—Alexander Weitz

[57] ABSTRACT

A silicone rubber composition having good processability and good molding properties is disclosed, said composition comprising:

(A) an organopolysiloxane containing vinyl groups;
(B) a fluorine resin powder;
(C) an organopolysiloxane containing units having the formula $$F(CF_2)_a CH_2 CH_2 Si(Me)_n O_{3-n/2}$$

in which a is an integer of at least 4, n is 0, 1 or 2 and Me denotes a methyl radical;
(D) a reinforcing silica powder having a surface area of at least 50 m$^2$/g; and
(E) a sufficient quantity of a curing agent to cure said composition.

4 Claims, No Drawings

SILICONE RUBBER COMPOSITION

FIELD OF THE INVENTION

This invention relates to a silicone rubber composition. More particularly, this invention relates to a silicone rubber composition that can be used to make a silicone rubber having good processability, good molding properties, and good physical properties as the result of curing.

BACKGROUND OF THE INVENTION

As silicone rubber compositions can be used to make molded products having good resistance to both heat and cold, these compositions were used for applications requiring the above-mentioned properties. In order to improve both the processability and the molding properties of the silicone rubber compositions, silicone rubber compositions containing fluorine resin powders were made the subject of patent applications. For example, a conductive silicone rubber having an improved rolling processability and containing fluorine resin powder in the organopolysiloxane raw rubber is disclosed in Japanese Kokai Patent Application No. Sho 58(1983)-194949. A rubber-type elastic material used for typing characters and having both good abrasion resistance and good dimensional stability, and containing fluorine resin powders such as polytetrafluoroethylene, in the silicone raw rubber is disclosed in Japanese Kokai Patent Application No. Sho 60(1985)-36171. However, when a large amount of fluorine resin powder is used, the viscosity of the silicone rubber composition is so high that both the processability and the molding properties are decreased.

SUMMARY OF THE INVENTION

In an attempt to solve the problems described above, this invention provides silicone rubber compositions with excellent physical properties after curing, as well as with good molding properties and processability, by mixing fluorine resin powders and specific organopolysiloxane into a silicone composition containing vinyl functional diorganopolysiloxane and reinforcing silica.

This invention therefore relates to a silicone rubber composition, comprising (A) a diorganopolysiloxane containing vinyl groups (100 parts by weight), (B) a fluorine resin powder (0.01-50 parts by weight), (C) an organopolysiloxane (0.01-40 parts by weight) containing a unit of the following formula:

$F(CF_2)_aCH_2CH_2Si(Me)_nO_{3-n/2}$ wherein a is an integer of 4 or greater, n is 0 or 1 or 2, and Me hereinafter denotes a methyl group, (D) a reinforcing silica powder (10-100 parts by weight) having a value of 50 m²/g or more for the specific surface area, and (E) a curing agent.

DETAILED DESCRIPTION OF THE INVENTION

The composition of this invention chiefly consists of an organopolysiloxane containing vinyl groups as component (A) of this invention. Any conventional organopolysiloxane can be used as the chief component of the silicone rubber. Examples of the component include the following: dimethylpolysiloxane with terminal dimethylvinylsiloxy groups, copolymers of a dimethylsiloxane and methylvinylsiloxane, having terminal dimethyl-vinylsiloxy groups, copolymers of a dimethylsiloxane and methylvinylsiloxane having terminal trimethylsiloxy groups and methylvinylsiloxane, and copolymers of a dimethylsiloxane and dimethylvinylsiloxane having terminal dimethylhydroxysiloxy groups. The preferred content of the methylvinylsiloxane unit is 0.1-5 mol %. The polymerization degree of this component is suitably 100-20,000.

Examples of the fluorine resin powder used as component (B) for the composition of this invention include polymers of polytetrafluoroethylene or copolymers of tetrafluoroethylene and other monomers. Examples of other monomers include the following: hexafluoropropylene, chlorotrifluoroethylene, perfluoroalkyl vinyl ether, perfluoroalkoxyalkyl vinyl ether, trifluoroethylene, perfluoroalkylethylene. Either spherical, oval, flaky, cylindrical, stringy or fibrous primary particles of this component can be used. The size is suitably 100 μm or less, preferably 0.05-10 μm. The amount of this component is suitably 0.01-50 parts by weight per 100 parts by weight of the component (A), preferably 0.1-20 parts by weight per 100 parts of (A).

An organopolysiloxane containing units of the formula $F(CF_2)_aCH_2CH_2SiMe_nO_{3-n/2}$ is used as component (C) for the compositions of this invention; this component characterizes the composition of this invention, and work as a compatibilizing agent for components (A) and (B). In the above-mentioned formula, a is an integer of 4 or greater, e.g., 4 or 6 or 8. However, these can be mixed. The variable n is 0 or 1 or 2. When n is 0 or 1, the units of $F(CF_2)_aCH_2CH_2SiMe_nO_{3-n/2}$ are located in the main chain of this component. When n is 2, the units of $F(CF_2)_aCH_2CH_2SiMe_nO_{3-n/2}$ are located at a terminus of this component. Either a straight-chain, branched, or ring structure may be suitable for this component. The viscosity of this component is preferably in the range of 10-10,000 cP at 25° C. The amount of this component to be used is suitably 0.01-40 parts by weight per 100 parts by weight of component (A), preferably 0.1-10 parts by weight. When used at level of less than 0.01 part by weight, it is not effective as a compatibilizing agent for components (A) and (B). At more than 40 parts by weight of (C), the physical properties of the silicone rubber are worsened after the composition is cured.

Examples of this component include organopolysiloxanes of the following formulas:

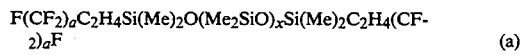

$F(CF_2)_aC_2H_4Si(Me)_2O(Me_2SiO)_xSi(Me)_2C_2H_4(CF_2)_aF$     (a)

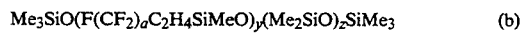

$Me_3SiO(F(CF_2)_aC_2H_4SiMeO)_y(Me_2SiO)_zSiMe_3$     (b)

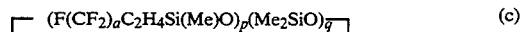

$[(F(CF_2)_aC_2H_4Si(Me)O)_p(Me_2SiO)_q]$     (c)

The variable a of formula (a) is the same as mentioned above. The variable x is an integer from 0-300. When x is more than 300, this component is not effective as a compatibilizing agent. Examples of synthesis methods for the preparation of organosiloxanes of formula (a) include the following: hydrolysis of fluoroalkyldimethylchlorosilane, cohydrolysis of both fluoroalkyldimethylchlorosilane and dimethyldichlorosilane, and equilibrium polymerization of fluoroalkylmethylpolysiloxanes made by the above-mentioned method and cyclic dimethyl polysiloxanes in the presence of a polymerizing catalyst.

The variable a of formula (b) is the same as mentioned above; y and z are integers of 1 or greater. The ratio y/z is suitable 0.1 to 0.9 and (y+z) is suitably 2 to 1,000. When (y+z) is more than 1000, the viscosity of this component becomes so high that the effectiveness of this component as a compatibilizing agent is decreased. The organopolysiloxane of formula (b) is a copolymer, examples including both random copolymers and block copolymers. Examples of synthesis methods for the preparation of organopolysiloxanes of formula (b) include the following: cohydrolysis of a fluoroalkylmethyldichlorosilane and dimethyldichlorosilane, followed by equilibrium copolymerization with a disiloxane of the formula $(Me_3Si)_2O$ in the presence of a basic catalyst; conventional dehydration polycondensation of $\alpha$, $\omega$-dihydroxypolyfluoroalkylmethylsiloxane (synthesized by hydrolysis of a fluoroalkylmethyldichlorosilane), with $\alpha$, $\omega$-dihydroxypolydimethylsiloxane (synthesized by hydrolysis of dimethyldichlorosilane), or chain extension of $\alpha$, $\omega$-dihydroxypolyfluoroalkylmethylsiloxane and $\alpha$, $\omega$-dihydroxypolydimethylsiloxane in the presence of e.g., $Me_3SiOH$. An organic solvent is often used for the synthesis of the organopolysiloxane of formula (b).

The same value of the subscript a as mentioned above is used for formula (c); both p and q are integers of 1 or greater. (p+q) is suitably between 3 and 40. The cyclic organopolysiloxane of formula (c) is a random copolymer or block copolymer, a block copolymer being preferred for this component. Examples of synthesis methods for the preparation of the cyclic organopolysiloxane of formula (c) include the following: equilibrating an $\alpha$, $\omega$-dihydroxyfluoroalkylmethylsiloxane/dimethylsiloxane copolymer, (synthesized by the cohydrolysis of a fluoroalkylmethyldichlorosilane with dimethyldichlorosilane), using a conventional basic catalyst, followed by conversion of the equilibrated product to a cyclic product; conventional dehydration polycondensation of an $\alpha$, $\omega$-dihydroxypolyfluoroalkylmethylsiloxane (synthesized by hydrolysis of a fluoroalkylmethyldichlorosilane) with $\alpha$, $\omega$-dihydroxypolydimethylsiloxane (synthesized by hydrolysis of dimethyldichlorosilane) or chain extension. An organic solvent is often used for the synthesis of the cyclic organopolysiloxane represented in general formula (c).

Any conventional type of reinforcing silica fine powder can be used for component (D) of the composition of this invention as a filler. Examples of these powders include the following: fumed silica fine powder made by a dry method, sintered silica fine powder, precipitated silica fine powder made by a wet method. Hydrophobic silica fine powder with surfaces which have been treated with either dimethyldichlorosilane or hexamethyldisilazane also can be used. The specific surface area of this component is equal to 50 $m^2/g$ or more, preferably 100–400 $m^2/g$. The content of this component is 10–100 parts by weight per 100 parts by weight of component (A), preferably 20–50 parts by weight is so employed.

A curing agent is used as component (E) of this invention for curing the composition. Any conventional type of curing agent used for curing a silicone rubber composition is suitable. Examples of curing agents include the following: agents consisting of a combination of either organic peroxide or an organohydrogen polysiloxane containing 2 or more silicon-bonded hydrogen atoms per molecule and a platinum catalyst. Examples of organic peroxides include the following: benzoyl peroxide, dicumyl peroxide, ditert-butyl peroxide, tert-butylmonochlorobenzoyl peroxide, and 2,5-dimethyl-2,5-di(tertbutylperoxy)hexane. Examples of organohydrogen polysiloxanes include the following: dimethylsiloxane/methyl hydrogen siloxane copolymers, both ends of which are terminated with trimethylsiloxy groups; methyl hydrogen polysiloxanes, both ends of which are terminated with trimethylsiloxy groups; cyclic methyl hydrogen siloxane. Examples of platinum catalysts include the following: chloroplatinic acid, complexes of chloroplatinic acids and olefin compounds; and complexes of chloroplatinic acid and divinyltetramethyldisiloxane.

The composition of this invention is prepared by homogeneously mixing all of the above-mentioned components (A)–(E). Any conventional additive used for silicone rubber compositions may also be used in addition to these components.

Examples of additives include the following, e.g., diorganopolysiloxanes containing silanol endgroups and having a low polymerization degree. This diorganopolysiloxane is used as a wetting agent for increasing the affinity between component (A) (diorganopolysiloxane) and component (D) (reinforcing silica fine powder). Examples of organic groups contained in a main chain of this additive diorganopolysiloxane include the following: alkyl groups such as methyl groups, ethyl groups, propyl groups, aryl groups such as phenyl groups, alkenyl groups such as vinyl groups, aryl groups, 3,3,3-trifluoropropyl groups. A $F(CF_2)_aCH_2CH_2$ group may be included as an organic group to increase compatibility with the organopolysiloxane of component (C). The preferred polymerization degree for the organopolysiloxane additive is 2–100, preferably 2–30. Examples of other additives which may be used include the following: volume-increasing fillers such as finely crushed quartz, diatomaceous earth, calcium carbonate, aluminosilicate; heat-resistant agents such as iron oxide, cerium oxide, aluminum oxide, zinc oxide, manganese carbonate; fire-retardant agent; titanium; and carbon black.

Because the composition of this invention contains component (C) which is used as a compatibilizing agent, the compatibility between components (A) and (B) is increased; this results in an improvement in the dispersibility of component (B) in component (A) and the amount of component (B) to be contained in the composition can be increased. Accordingly, a silicone rubber having good physical properties and exhibiting no damage to either the processability or molding properties can be made.

EXAMPLES

In the following, this invention is explained with application examples. Unless indicated to the contrary, "parts" means parts by weight, "Me" is a methyl group, the viscosity is measured at 25° C., and cP means centipoise.

APPLICATION EXAMPLE 1

The following components were uniformly blended in a kneader mixer: 100 parts of a diorganopolysiloxane containing vinyl groups whose ends had been terminated with dimethylvinylsiloxy groups, having a value of 7,000 for the average polymerization degree, and consisting of 99.5 mol % dimethylsiloxane units and 0.5 mol % methylvinylsiloxane units, 1 part of polytetrafluoroethylene resin fine powder having an average particle size distribution of 0.2–0.3 μm (Mitsui Du Pont Fluorochemical K.K., brand: Teflon ® 6C-J), 1 part of an organopolysiloxane of the formula $$F(CF_2)_8C_2H_4SiMe_2O(Me_2SiO)_{x'}SiMe_2C_2H_4(CF_2)_8F$$

in which $x'$ is the value required to provide a viscosity of 50 cP, 35 parts of fumed silica which was hydrophobically treated with dimethyldichlorosilane and having a value of 200 m²/g for the specific surface area. Then, the mixture was heated for 2 hours at 120° C. to make a silicone rubber base.

2,5-dimethyl-2,5-di(tert-butylperoxy)hexane (0.5 part) was added to the above silicone rubber base (100 parts), and the combination was homogeneously mixed using 2 rollers to make a silicone rubber composition. The product silicone rubber composition was press molded at 170° C. under 30 kg/cm² for 10 min. A silicone rubber sheet having a 2-mm thickness was made. After heating the product sheet to 200° C. for 4 hours in an oven, the physical properties of the sheet were measured. The measurements were based on JIS K 6301. The results are shown in Table I.

Application Example 2

The silicone rubber base of Application Example 1 (100 parts), was homogeneously mixed with the following; methylhydrogenpolysiloxane (1 part), both ends of which were terminated with trimethylsiloxy groups, having a 20-cP viscosity, a complex of chloroplatinic acid and divinyltetramethyldisiloxane (an amount equivalent to 25 ppm platinum weight), phenylbutanol used as a reaction inhibitor, (0.05 part). A silicone rubber composition was made and press molded at 150° C. under 30 kg/cm² for 10 min to make a 2 mm-thick silicone rubber sheet. The physical properties of the sheet were measured and the results are shown in Table I.

Comparative Example 1

A silicone rubber composition was made by the same process used for Application Example 1 but the organopolysiloxane of formula $F(CF_2)_8C_2H_4SiMe_2O(Me_2SiO)_{x'}SiMe_2C_2H_4(CF_2)_8F$ was omitted. The resulting silicone rubber composition was molded in the same pressing process used for Application Example 1 to make a silicone rubber sheet. However, the viscosity of the composition was so high that it was difficult to fill the mold and no satisfactory sheet could be made.

Application Example 3

The following ingredients were uniformly remixed in a kneader mixer: diorganopolysiloxane (100 parts) both ends of which were terminated with trimethylsiloxane groups, and consisting of dimethylsiloxane units (99.5 mol %) and methylvinylsiloxane units (0.5 mol %), and which had an average polymerization degree of 7,000, polytetrafluoroethylene resin fine powder (5 parts) having an average particle size of 3 μm; an organopolysiloxane (0.6 part) of the formula $$Me_3SiO(C_4F_9C_2H_4SiMeO)_{y'}(Me_2SiO)_{z'}SiMe_3$$

in which $y':z'$ equal to 1:1, having a viscosity of 700 cp, a cyclic organopolysiloxane (0.4 part) of the following formula:

wherein the ratio of $p':q'$ is 1:1 and the viscosity was 70 cp, fumed silica (30 parts) having a specific surface area of 110 m²/g. Then, the mixture was treated by heating at 120° C. for 2 hours to make a silicone rubber base.

2,5-dimethyl-2,5-di(tert-butylperoxy)hexane (0.5 part) was added to the above silicone rubber base (100 parts), and the combination homogeneously mixed using 2 rollers. The product silicone rubber composition was press molded at 170° C. under 30 kg/cm² for 10 min. A silicone rubber sheet having a 2-mm thickness was made. The sheet was heated in an oven for 4 hours at 200° C., then the physical properties of the sheet were measured, the results being shown in Table I.

APPLICATION EXAMPLE 4

Diorganopolysiloxane (100 parts) whose ends were terminated with dimethylvinylsiloxane groups, and which consisted of dimethylsiloxane units (99.7 mol %) and methylvinylsiloxane units (0.3 mol %), and having a value of 7,000 for the average polymerization degree was placed in a kneader mixer. Dimethylpolysiloxane (8 parts), both ends of which were terminated with dimethylvinylsiloxane groups, and which had an average polymerization degree of 5, was also placed in the kneader mixer. Then, fumed silica (35 parts) having a specific surface area of 300 m²/g was also introduced, and homogeneously kneaded in. Then, polytetrafluoroethylene resin fine powder (2 parts) having an average particle size distribution of 0.2–0.3 μm (Mitsui Du Pont Fluorochemical K.K., brand: Teflon ® 6C-J) and an organopolysiloxane (0.8 part) of the formula $Me_3SiO(F(CF_2)_8C_2H_4SiMeO)_{y''}(Me_2SiO)_{z''}SiMe_3$ (ratio of $y'':z''$ is equal to 1:5) and having a 500-cP viscosity, was added, then kneaded for 1 hour. A silicone rubber base was made.

2,5-dimethyl-2,5-di(tert-butylperoxy)hexane (0.5 part) was added to the above silicone rubber base (100 parts), then homogeneously mixed using 2 rollers. A silicone rubber composition was made. The product silicone rubber composition was press molded at 170° C. under 30 kg/cm² for 10 min to make a silicone rubber sheet having a 2-mm thickness. The sheet was heated in an oven for 4 hours at 200° C., and the physical properties of the sheet were measured. The measurements were based on JIS K 6301 and the results are shown in Table I.

TABLE I

| Classification Item | Application Example | | | |
|---|---|---|---|---|
| | 1 | 2 | 3 | 4 |
| Hardness (JIS K) | 52 | 53 | 54 | 55 |
| Tensile Strength (kg/cm²) | 99 | 105 | 90 | 110 |
| Elongation (%) | 480 | 550 | 390 | 670 |
| Breaking Strength (kg/cm²) | 24 | 25 | 23 | 25 |

That which is claimed is:
1. A silicone rubber composition comprising:
(A) 100 parts by weight of an organopolysiloxane containing vinyl groups;

(B) 0.01 to 50 parts by weight of a fluorine resin powder;

(C) 0.01 to 40 parts by weight of an organopolysiloxane represented by the formula

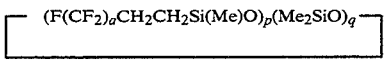

in which a is an integer of at least 4, Me denotes a methyl radical, p and q are integers having a value of at least 1 and (p+q) is 3 to 40;

(D) 10 to 100 parts by weight of a reinforcing silica powder having a surface area of at least 50 m²/g; and (E) a sufficient quantity of a curing agent to cure said composition.

2. The composition according to claim 1, wherein a is 4 to 8.

3. The composition according to claim 2, wherein said fluorine resin powder (B) is polytetrafluoroethylene.

4. The composition according to claim 2, wherein said organopolysiloxane (A) is selected from the group consisting of dimethylpolysiloxane having terminal dimethylvinylsiloxy groups, copolymers of dimethylsiloxane and methylvinylsiloxane having terminal dimethylvinylsiloxy groups, copolymers of dimethylsiloxane and methylvinylsiloxane having terminal trimethylsiloxy groups and copolymers of dimethylsiloxane and methylvinylsiloxane having terminal dimethylhydroxysiloxy groups.

* * * * *